Nov. 2, 1965   H. F. SZCZEPANSKI   3,215,164
WATER HAMMER DAMPENER
Filed July 5, 1962
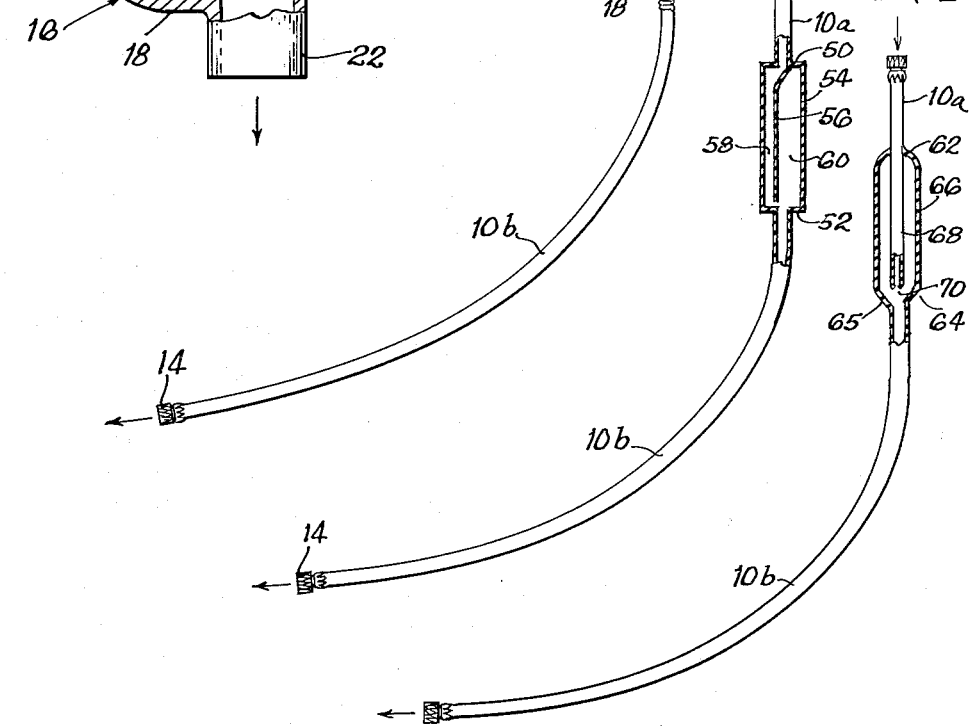
INVENTOR.
Henry F. Szczepanski
BY
Ooms, McDougall and Hersh
Att'ys United States Patent Office 3,215,164
Patented Nov. 2, 1965

3,215,164
WATER HAMMER DAMPENER
Henry F. Szczepanski, 843 S. 4th, Lander, Wyo.
Filed July 5, 1962, Ser. No. 207,705
3 Claims. (Cl. 138—26)

This invention relates to the elimination of the hammering noise that arises in water pipes when water flow is suddenly shut off, as by means of a faucet, flow control valve or the like in a water piping system. The hammering noise arising from the sudden disturbance of water flow results from the pressure conditions existing and is referred to in the trade as "water hammer."

In the past, water hammer has been taken care of, in part, by the use of a short stub of a pipe branched from the main line and which is adapted to provide an air cushion that tends to absorb the shock from the sudden change in water flow. Such branching stub pipe has usually been provided in the form of a metal piping forming a part of the main water supply line. Unless such branch piping has been incorporated into the piping system, when installed, means have not been available to eliminate the water hammer without high cost for modification and installation of a suitable piping system.

Further, it has been found that water hammer still exists, but to a lesser extent, and that the water hammer continues for a length of time until the affect of the water shock is completely dissipated through the piping system. Until then, the water shock which results in the water hammer travels throughout the piping system and can often be heard throughout the house or building.

It is an object of this invention to provide a means for substantially immediately and effectively dissipating water shock to the extent that the water hammer is materially reduced and substantially completely and immediately eliminated.

Another object of this invention is to provide a more effective means for combating water hammer, and it is a related object to provide a means of the type described which does not require installation into the piping system but, instead, is embodied in the form of a hose connection between the outlet from the water supply to the utility making use of the same.

More specifically, it is an object of this invention to provide a hose attachment which is adapted to interconnect the flow control means with the water supply source, and which embodies means for the effective relief of water shock which is responsive to the sudden stoppage of water flow by the flow control valve.

These and other objects and advantages of this invention will hereinafter appear and, for purposes of illustration, but not of limitation, an embodiment of the invention is shown in the accompanying drawing, in which—

FIG. 1 is a schematic front elevational view of a hose connection embodying the features of this invention;

FIG. 2 is a sectional view in detail showing a connector between the water line and the shock-absorbing stub section;

FIG. 3 is an elevational view of a modification in a hose connection embodying the features of this invention; and FIG. 4 is an elevational view of a further modification in a hose connection.

The invention has particular application where a utility, such as a clothes washing machine or a dishwasher, is installed within a home where the usual stub pipe for dampening the water does not form a part of the installed water piping system. Sometimes, space is not available for modification of the piping. Aside from the space requirement, the cost for modification of the piping system is quite high and the effect is sometimes quite low.

In accordance with the practice of this invention, there is provided a length of hose for interconnecting the water pipe with the inlet to the utility, as represented by the length of hose 10 formed of rubber-like material having an inlet connection 12 at one end for communication with the outlet of the water pipe 10ª, and an outlet connection 14 at the other end for communication with the inlet to the utility.

Intermediate the length of hose, there is provided a tubular coupling member 16 in the form of a Y-section having a cross-connecting member 18 intermediate a pair of laterally spaced apart substantially perpendicularly extending stub sections 19 and 20 and another stub section 22 extending in the opposite direction in endwise alignment with one of the stub sections 19 and 20.

The section 10ᵇ of the hose 10 interconnects the inlet to the utility with the stub section 22, while the hose section 10ᶜ interconnects the outlet with the other of the stub sections 19 or 20 which is out of alignment with the stub section 22, so that the water flow will have to be turned through an angle of about 90° during flow from the stub section 19 into the cross-connecting member 18 then through another angle of about 90° during flow from the cross-connecting member 18 to the stub section 22 and into the hose section 10ᵇ.

The stub section 20, in direct alignment with the stub section 22, is provided with a short section of a rubber hose 24 which is sealed off at the end, as by means of a plug 26 to provide a flexible, sealed air chamber therein.

The air chamber formed of the flexible, rubber-like material has been found to be very effective for dampening water shock resulting from the sudden shut-off of water flow by the utility, since the air chamber is in direct alignment with the shock wave that travels back from the shut-off valve. Thus the flexible air chamber receives directly the shock before it travels back through the remainder of the water piping system.

Because the hose section 24 is formed of flexible, rubber-like material, it has been found to be better able to absorb the shock than rigid tubing. It is also capable of sufficient deformation by way of expansion and contraction whereby it is able more completely and more effectively to dissipate the back pressure resulting from the sudden stoppage of water flow. Thus the water hammer is more quickly and more effectively eliminated, and the danger of bursting pipes is considerably obviated.

The rate of deadening of water hammer and the rate of dissipation of water shock by absorption differs in kind by reference to the reactions that take place in the use of rigid tubing for the same purpose.

It has been found that the desired dampening of water hammer and elimination of the travel of water shock back into the piping system can be further enhanced by construction of the coupling member 16 with a restriction 30 in the passage 32 communicating the cross-connecting member 18 with the continuous passage 34 between the aligned stub sections 20 and 22 and through which the water must travel when passing forwardly from the piping to the utility, and through which the water shock must travel backwardly from the utility to the piping system. This type of restriction, at the point of the 90° turn, introduces a resistance of the free passage of the water shock backwardly through the pipe connection and thus limits the water shock and the water hammer for concentration upon passage into the chamber embodied within the stub section 24 where greater effort can be obtained for dissipation.

In the modification shown in FIG. 3, the hose sections 10ª and 10ᵇ lead into the opposite ends 50 and 52 respectively of a tubular housing 54 which is formed of a rubber-like or other elastomeric material. The interior of the housing is divided lengthwise by a wall 56 which extends from the one end 50 on one side of the opening communicating with the hose portion 10ᵃ to a position short of the opposite end 52 and offset to the other side of the opening communicating the hose portion 10ᵇ. Thus the walls subdivide the interior of the housing into a main chamber 58 in direct communication with the hose portion 10ᵃ and a dampening chamber 60 which is substantially in endwise alignment with the inlet from the hose portion 10ᵇ.

The offset formed by the wall 56 to align the opening in the hose section 10ᵇ with the offset chamber 60 also provides a desirable restriction at the end portion 52 so that the pressure traveling back through the hose portion 10ᵇ will be concentrated in the dampening chamber 60, as previously described with reference to the modification shown in FIGS. 1 and 2.

In the modification shown in FIG. 4, the hose sections 10ᵃ and 10ᵇ are again connected to the opposite ends 62 and 64 respectively of a tubular member 66 formed of a rubber-like or elastomeric material. The tubular housing is fitted with a tubular section 68 of smaller diameter and of shorter length than the tubular member 66 and which communicates directly with the inlet opening in the end portion 62 of the housing that communicates with the outlet of the hose portion 10ᵃ. As a result, the water flowing through the tubular section from the hose portion 10ᵃ will be required to enter the housing through the far end of the tubular section 68. On the other hand, the hose section 10ᵇ communicates with a conically shaped end portion 65 of the tubular housing for direct communication with substantially the entire cross-section of the housing. The outlet end of the tubular section 58, adjacent the end 64 of the housing, is formed with a restriction 70 so that the pressure traveling back through the hose section 10ᵇ will be concentrated in the housing portion about the tubular section.

It will be apparent that I have provided a very simple and effective means for the elimination of water shock and water hammer. It will be apparent further that I have embodied such means in an attachment which can be used to connect a utility with the water supply thereby to protect the water supply without costly installation. It will be understood that the connection described can be used with utilities other than dishwashers, clothes washers and the like, and can instead be used with any water flow system which is provided with water flow control valves or faucets capable of sudden shut-off of water flow.

It will be understood that changes may be made in the details of construction, arrangement and operation, without departing from the spirit of the invention, especially as defined in the following claims.

I claim:

1. An attachment for minimizing the back travel of water shock and water hammer resulting from sudden change in the flow of water between an outlet and an inlet, comprising an extension hose having a connection at one end for attachment to the water outlet and a connection at the other end for attachment to the water inlet, a connector in an intermediate portion of the hose, subdividing the hose into two sections, said connector comprising a cross-conduit portion and communicating conduit portions extending perpendicularly from the cross-conduit portion with one pair extending in one direction in laterally spaced apart relation and another extending in the opposite direction in substantial alignment with one of the communicating conduit portions of the pair, the one of the communicating conduit portions of the pair out of alignment being connected to the hose portion connected to the outlet, the other communicating conduit portion being connected to the hose portion connected to the inlet, a short length of tubing of flexible, resilient, rubber-like material connected at one end to the other of the communicating conduit portions of the pair, and means sealing the other end of the flexible tubing, said connector having a throat restricting the opening between the aligned, oppositely directed communicating conduit portions and the cross-conduit portion and in which the restricting throat is in the cross-conduit portion adjacent the passage between the oppositely directed communicating conduit portions.

2. An attachment for minimizing the back travel of water shock and water hammer resulting from sudden change in flow of water between an outlet and an inlet comprising an extension hose having a connection at one end for attachment to the water outlet and a connection at the other end for attachment to the water inlet, a connector in an intermediate portion of the hose, said connector comprising an elongate housing of resilient material having an inlet at one end in communication through the hose with the water outlet and an inlet at the other end in communication through the hose with the water inlet, a wall subdividing said housing lengthwise into a main chamber and a compression chamber with the main chamber in communication directly with the inlet and with the compression chamber substantially aligned lengthwise with the outlet and in communication therewith.

3. An attachment as claimed in claim 2 in which the wall extends lengthwise from one side of the inlet to the opposite side of the outlet and from the wall containing the inlet to a point short of the wall containing the outlet.

References Cited by the Examiner

UNITED STATES PATENTS

| | | | |
|---|---|---|---|
| 97,767 | 12/69 | Douglas | 138—26 |
| 679,786 | 8/01 | See | 138—26 |
| 953,966 | 4/10 | Mueller | 138—26 XR |
| 1,140,896 | 8/15 | Chambers | 138—30 |
| 1,644,794 | 10/27 | Saharoff | 181—57 |
| 1,774,095 | 8/30 | Hajek | 138—26 XR |
| 2,630,833 | 3/53 | Ragsdale | 138—26 |
| 2,838,073 | 6/58 | Di Mattia et al. | 138—30 |
| 2,881,795 | 4/59 | Waldenmaier et al. | 137—525.3 |

FOREIGN PATENTS

| | | |
|---|---|---|
| 1,119,666 | 6/56 | France. |
| 1,245,959 | 10/60 | France. |
| 14,178 | 4/05 | Great Britain. |

LEWIS J. LENNY, *Primary Examiner.*

EDWARD V. BENHAM, *Examiner.*